United States Patent [19]
Sauthier et al.
[11] 4,011,713
[45] Mar. 15, 1977

[54] BATTERY POWERED ELECTRONIC TIMEPIECE WITH VOLTAGE REGULATION

[75] Inventors: Pierre A. Sauthier, Bruegg; Werner Fehr, Zurich, both of Switzerland
[73] Assignee: Societe Suisse pour l'Industrie Horlogere Management Services, S. A., Bienne, Switzerland

[22] Filed: June 17, 1975
[21] Appl. No.: 587,726
[30] Foreign Application Priority Data
July 15, 1974 United Kingdom ............ 31255/74
[52] U.S. Cl. .............................. 58/23 BA; 307/81; 320/1
[51] Int. Cl.[2] ....................... G04C 3/00; H02J 1/00
[58] Field of Search ............ 58/23 R, 23 A, 23 BA; 307/80, 81; 320/1

[56] References Cited
UNITED STATES PATENTS
3,913,006 10/1975 Fillmore ........................... 58/23 A Primary Examiner—E. S. Jackmon
Attorney, Agent, or Firm—Griffin, Branigan and Butler

[57] ABSTRACT

A battery powered electronic timepiece of the type comprising an oscillator, adapted to generate high frequency electric pulses, a frequency divider arranged to receive said high frequency electric pulses and to deliver low frequency electric pulses, a stepping motor adapted to be controlled by said low frequency electric pulses and to drive display means and a battery arranged to energize the oscillator, frequency divider and stepping motor, a condensor is coupled to the oscillator and frequency divider and a switch, which receives control signals from the frequency divider, is arranged to provide a low resistance path from the battery to the condensor in the intervals between motor stepping pulses, and a high resistance pass from the battery to the condensor during motor stepping pulses, whereby during motor stepping pulses the oscillator and frequency divider are energized substantially entirely from the condensor.

10 Claims, 5 Drawing Figures

BATTERY POWERED ELECTRONIC TIMEPIECE WITH VOLTAGE REGULATION

Figure 1A:
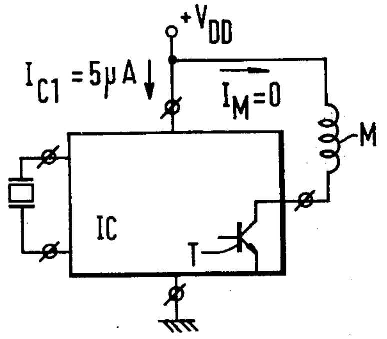

In prior art timepieces of the type employing an oscillator, a frequency divider, and a stepping motor for driving a display, the battery provides two types of current: the first energizing the oscillator, frequency divider and motor control and the second energizing the motor. For practical purposes the first may be considered as a direct current and will not amount to more than a few microamperes. The second type of current, however, is pulsed and the pulses may attain several hundreds of microamperes over an interval of time lasting from a few milliseconds to some tens of milliseconds.

The batteries used for such timepieces provide a resistance in series with the voltage source and such resistance may vary considerably with the ambient temperature. Thus at normal room temperatures (for example 20°) it may be negligible. However, should ambient conditions change to the extent that the temperature drops below 0° this resistance may rise to several hundreds of ohms. Thus at such low temperatures the voltage available at the battery terminals will drop considerably during motor energizing pulses.

Since stepping motors may be designed to work satisfactorily over a fairly large voltage range, for example from 0.7 V to 1.5 V, the voltage drop of the battery is not a serious difficulty so far as the proper motor function is concerned.

However, in such timepieces the integrated circuits in general have a voltage threshold at a considerably higher level, for example around 1.2 V in the CMOS technology as currently employed. Should the available voltage fall under this threshold that is to say less than 1.2 V, the oscillator and the frequency divider will cease their function. Such a situation may be of considerable danger for an electronic timepiece since the failure will take place during a motor energizing pulse. Since the duration of such a pulse is determined by the frequency divider it will be clear that such pulse, having stopped operation of the circuit, will in itself continue thereby leading to a rapid discharge of the battery.

In order to avoid this difficulty thus caused by the characteristics of presently available batteries it is desirable to regulate or stabilize the battery voltage during motor pulses. A possible solution could be to use two separate batteries. This, however, is not a desirable arrangement when one considers the volume of space available in a wrist watch for example.

The basic idea thus is to arrive at a stabilization through use of a condensor which will be capable of replacing the battery during critical moments. The condensor may be recharged between two motor pulses across a resistance. Such an arrangement, however, may prove inconvenient in view of the choice of a resistance which must have a low value in order that the condensor is charged to a voltage as close as possible to that of the battery, but at the same time must have a high value in order to avoid that the energy stored in the condensor intended for the integrated circuit is applied rather to the motor winding.

The present invention provides a solution to the problem wherein a condensor is coupled to the oscillator and frequency divider and a switch which receives control signals from the frequency divider is arranged to provide a low resistance path from the battery to the condensor in the intervals between motor stepping pulses and a high resistance path from the battery to the condensor during motor stepping pulses whereby during motor stepping pulses the oscillator and frequency divider are energized substantially entirely from the condensor.

Figure 1B:
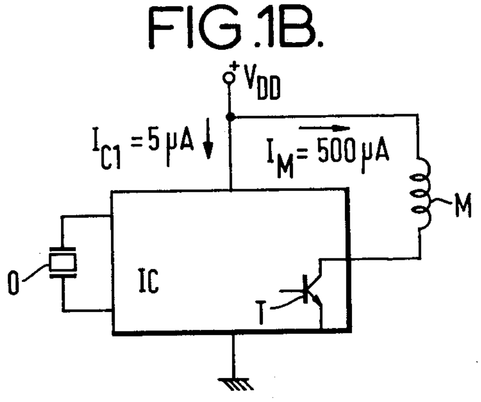
Figure 2:
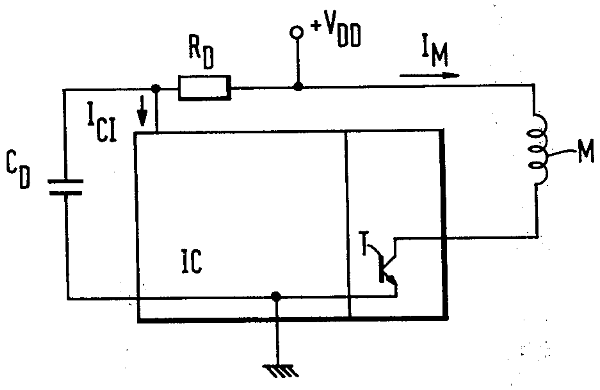
Figure 3:
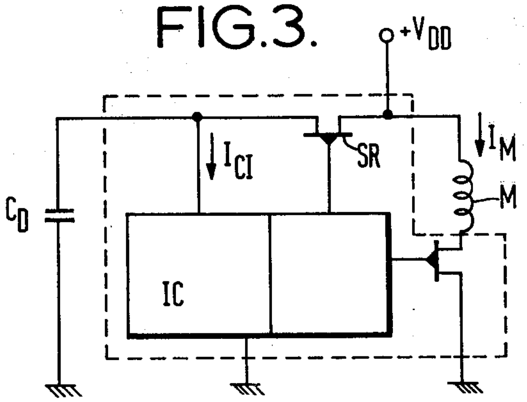
Figure 4:
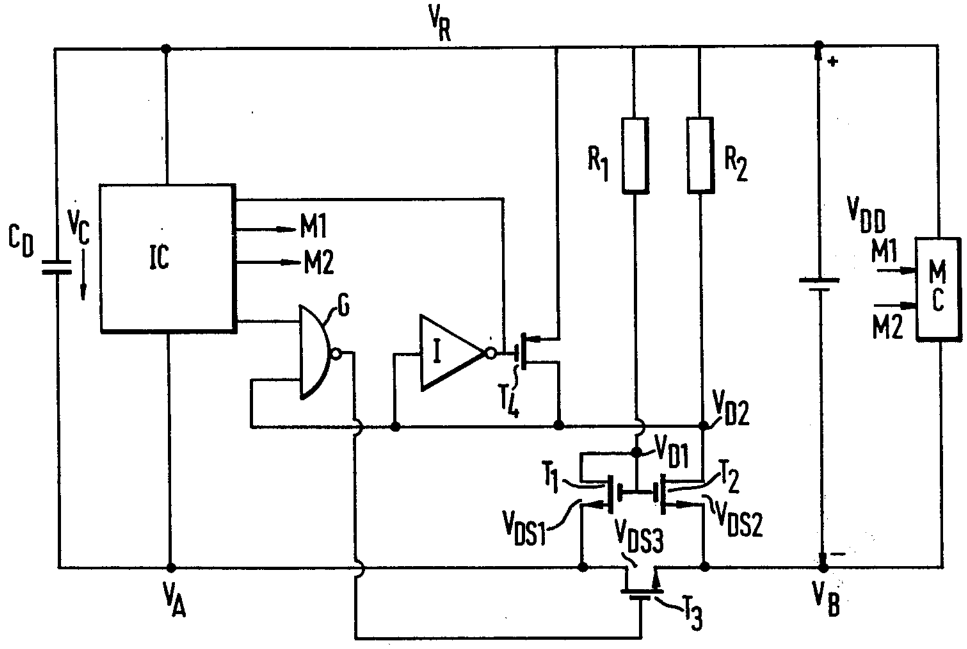

For a better understanding of the invention reference will now be made to the drawings in which:

FIG. 1*a* and 1*b* show the standard arrangement and illustrate the nature of the problem, FIG. 2 provides an illustration of a theoretical solution to the problem, FIG. 3 shows a preferred arrangement for the basic solution to the problem, FIG. 4 provides a practical embodiment of the theoretical preferred arrangement in FIG. 3.

In FIG. 1*a* and 1*b* the standard arrangement of the prior art is shown, and it will be seen that should for example the integrated circuit IC with its oscillator O and motor control transistor T consume 5 μA in the intervals between motor pulses, then during motor pulses which may amount to as much as 500 μA, there is a risk that the voltage $V_{DD}$ will fall to a value which is too low to sustain the necessary current of 5 μA for the integrated circuit. In this case the circuit will remain in its attained state whereby the motor control transistor will remain on and the current through the motor winding M will continue to flow until failure of the battery. This in turn could lead to battery leakage and destruction of the watch movement.

In FIG. 2 is shown the principle of voltage regulation in which a condensor $C_D$ is arranged to be charged by the voltage source $V_{DD}$ across a resistance $R_D$. As previously mentioned the problem here is to choose the resistance low enough to ensure that the condensor $C_D$ will be properly charged in the intervals between motor pulses, but at the same time will be high enough to ensure that during motor pulses the charge stored by the condensor is fed to the integrated circuit rather than to the motor winding. If we assume for example that the circuit requires continuous current of 5 μA, that the motor current is 500 μA during 10 ms, and the capacity of the condensor $C_D$ = 1 μF, it will be clear that in order to guarantee charging of the condensor to a level of 50 mV below that of the battery (1.35 V), the value of the resistance $$R_D \leq (50\ mV/5\ \mu A) = 10\ k\ \Omega$$

For such a case during a motor pulse and in assuming a motor resistance of 3 kΩ the condensor will provide a current of 5 μA to the integrated circuit and approximately (1.3 V/13 kΩ) = 100 μA to the motor and this 100 μA will represent an undesired discharge. After 10 ms thus at the end of the motor pulse there would still be a voltage of approximately $$1.3\ V - (105.10^{-6}.10^{-2}/1.10^{-6}) = 1.25\ V$$

In fact the voltage will not fall below that of the battery however, it is seen that the resistance $R_D$ is much too low.

If one were to choose a much higher resistance for $R_D$ the condensor would not be sufficiently charged since it will always be at $-(I_{C.I.} \times R_D)$ of the battery voltage. One solution would be to increase the capacity of the condensor but this again is incompatible with the available volume.

The preferred solution therefore may be as illustrated in FIG. 3 and 4 wherein FIG. 3 shows the principle of using a switchable resistance SR for recharging the condensor and such resistance may be in the form of a field effect transistor for example. In such form it provides two discrete values of resistance in accordance with a logical switching signal provided to the control gate, this signal having the same form as that used to control the motor. Thus during a motor pulse the resistance of the transistor will be at a high value in the order of several megohms and will effectively disconnect a circuit assembly formed by the charged condensor and the integrated circuit from the battery which at that moment is providing a motor pulse. Between motor pulses the resistance of the transistor will be low and will permit a rapid and complete recharging of the condensor $C_D$.

Consider next FIG. 4 which provides a practical realization of the invention as taught by FIG. 3. It will be further evident that the FIG. 4 realization provides additional advantages which will be referred to in the course of this description. FIG. 4, in order to assist in understanding the functioning thereof, is labeled so as to distinguish between voltage drops in various places thereof. The energy source in the form of a battery $V_{DD}$ is shown with one terminal connected to a line labeled $V_R$ and the other terminal connected to a line labeled $V_B$. A transistor $T_3$ couples the line $V_B$ to a line $V_A$ via the source drain path. This transistor $T_3$ corresponds to the control transistor as used in FIG. 3 to provide a switchable resistance for recharging the condensor $C_D$. Condensor $C_D$ it will be noted is connected between lines $V_R$ and $V_A$ as is the integrated circuit IC.

The control of the transistor $T_3$ is assured by an analog comparator formed by circuit $R_1T_1$ connected between lines $V_R$ and $V_A$ and $R_2T_2$ connected between lines $V_R$ and $V_B$. At the junction between $R_2$ and $T_2$ (as labeled in the drawing $V_{D2}$) a connection is led to one input of a NAND-gate G, the other input of which is obtained from the integrated circuit IC in coincidence with motor control pulses. The output from NAND-gate G is applied to the gate of transistor $T_3$ to control its conductivity state. A speed-up circuit in form of an inverter I and a transistor $T_4$ are further provided. The input to the inverter is obtained from the junction $V_{D2}$ and the output is applied to the gate of transistor $T_4$, the source drain path of which is connected between line $V_R$ and junction $V_{D2}$.

Motor control circuit $M_C$ receives its energy directly from lines $V_R$ and $V_B$ and its control signals $M_1$, $M_2$ are derived as shown from the integrated circuit IC.

Resistances $R_1$ and $R_2$ may comprise p channel transistors for ease of integration.

During normal function of the circuit the transistor $T_3$ which represents a switchable resistor is controlled by the frequency divider in the integrated circuit according to the description already given in respect of FIG. 3. The purpose of the present circuit is to assure:

1. that the transistor $T_3$ be switched on when the condensor $C_D$ is discharged, thus to permit proper charging of condensor $C_D$,
2. that there will be no motor pulse during charging of the condensor as well as for a certain period after this charging, thereby to avoid a voltage drop which could stop the oscillator during the motor pulse.

To this end an element is necessary which measures the voltage of the battery $V_{DD}$, the voltage of the condensor $V_C$, which compares these voltages and gives an output signal depending on these two input voltages. Assuming a normal battery voltage $V_{DD}$ of 1.35 V the following conditions may arise:

1. $V_{DD} = 1.35\ V$, $V_C = 0$ / start up
2. $V_{DD} = 1.35\ V$, $0 < V_C \leq 1.25\ V$ / condensor charging
3. $V_{DD} = 1.35\ V$, $1.25\ V < V_C < 1.35\ V$ / normal function
4. $V_{DD} < 1.25\ V$, $1.25\ V < V_C < 1.35\ V$/ battery at a temperature of −10° C during a motor pulse.

$T_3$ must then provide the following corresponding logic states:

1. $T_3$ = ON regardless of the signals provided by the integrated circuit,
2. $T_3$ = ON regardless of the signals provided by the integrated circuit,
3. $T_3$ depends on the motor pulses furnished by the integrated circuit: it is ON between pulses and OFF during pulses,
4. $T_3$ is OFF independent of the signals from the integrated circuit.

Effectively this latter situation arises only during abrupt voltage drops, thus during motor pulses.

From a study of FIG. 4 it will be appreciated that during:

1. start up $V_C = 0$ and the voltage drops across the drain source terminals of transistor $T_3$ ($V_{DS3} = V_{DD} = 1.35\ V$). Since the source of transistor $T_1$ is at the potential $V_R$ ($V_C = 0$) there will be no current flowing in $R_1$ and thus $V_{D1} = V_R$. Accordingly the potential drops across the gate source path ($V_{GS2}$) of transistor $T_2$ = 1.35 $V$ and transistor $T_2$ is on, whereby $V_{D2} = 0$. This is applied to the NAND-gate G, the output signal from which turns on $T_3$.
2. charging of $C_D$ : $0 < V_C < 1.25\ V$. Relative to $V_R$ the voltage $V_A$ drops, that is to say that $V_A$ approaches $V_B$ at the beginning and to the extent that $V_R - V_A = V_C$ remains below the threshold voltage of $T_1$, the latter remains non-conductive. Progressively, $T_1$ begins to conduct current as soon as $V_C$ exceeds the threshold voltage of transistor $T_1$. Effectively, it is to be seen that so long as the current through $R_1 = 0$, $V_C$ equals $V_{GS1}$. As soon as current flows through $T_1$ and thus $R_1$, the voltage $V_{D1}$ drops. This in turn brings about a lowering of the voltage $GV_{GS2}$, since $V_B$ is at a fixed potential. When $V_C$ arrives at 1.25 V, the current through $T_1$ and $R_1$ will be such that $V_{D1}$ will be equal to the threshold voltage of $T_2$, thereby indicating that any increase in $V_C$ will block transistor $T_2$ with the potential $V_{D1}$ approaching potential $V_B$. At the moment that $T_2$ stops conducting $V_{D2}$ changes from ~ $V_B$ to $V_R$, that is to say from 0 to 1 in terms of its logic value. The difference of 100 mV between $V_{DD}$ and $V_C$ at which the signal $V_{D2}$ changes, is determined by the geometrical relationship between $T_1$ and $T_2$ and may be varied according to the desired situation. In this respect it is noted that transistors $T_1$ and $T_2$ will be designed so as to operate within the exponential range of their respective characteristics.

Since the change over of $V_{D2}$ from a logical 0 to a logical 1 is gradual in view of the analog nature of the comparator, transistor $T_4$ is provided in order to accelerate the end of this transition. This transistor is controlled by the signal $V_{D2}$ as inverted by the inverter I. As is to be seen from the drawing signal $V_{D2}$ is applied to the NAND-gate G which controls the conductivity state of transistor $T_3$. As long as $V_{D2} = 0$ the output of NAND-gate G is at all times a logical 1 and transistor $T_3$ will be turned on. When $V_{D2}$ is equal to a logical 1, the output of NAND-gate G will depend on the motor pulses furnished by the integrated circuit IC. The safety time constant is obtained by resetting to 0 a portion of the frequency divider found within the integrated circuit IC as long as $V_{t/2}$ is equal to 0. As soon as $V_{t/2}$ changes to a logical 1, there will be a time delay $$0.75\ s \leq T \leq 1.25\ s$$

before the first motor pulse.

What we claim is:

1. In a battery powered electronic timepiece of the type having an oscillator for generating high frequency electric pulses, a frequency divider responsive to said high frequency electric pulses for producing low frequency electric pulses, a stepping motor responsive to said low frequency electric pulses for driving a display means, and a battery for energizing said oscillator, frequency divider and the stepping motor, the improvement comprising: a capacitor coupled to said oscillator and said frequency divider; and a switch means controlled by pulses from said frequency divider for providing a low resistance path from the battery to the condensor in the intervals between motor stepping pulses and a high resistance path from the battery to the condensor during motor stepping pulses, whereby during motor stepping pulses the oscillator and frequency divider are energized substantially entirely from the capacitor.

2. A battery powered electronic timepiece as claimed in claim 1 and further comprising: control circuit means for generating control signals determined by the relative voltage drops across the battery and the condensor; and gating means responsive to said control signals and pulses from said frequency divider for providing control signals to said switch means.

3. A battery powered electronic timepiece as claimed in claim 1 wherein the switch comprises a field effect transistor.

4. A battery powered electronic timepiece as claimed in claim 2 wherein said control circuit means comprises a measuring circuit for measuring and comparing the voltage drops across the battery and the condensor.

5. A battery powered electronic timepiece as claimed in claim 4 wherein the measuring circuit comprises a first series circuit including a resistance and a field effect transistor, said first series circuit being shunted across the condensor; and a second series circuit including a resistance and a field effect transistor, said second series circuit being shunted across the battery.

6. A battery powered electronic timepiece as claimed in claim 5 wherein the transistors in said first and said second series circuits are of different geometrical configuration.

7. A battery powered electronic timepiece as claimed in claim 5 wherein said transistors have gate elements connected to the resistance-transistor junction of the first series circuit.

8. A battery powered electronic timepiece as claimed in claim 7 wherein said transistors operate within the exponential range of their respective characteristics.

9. A battery powered electronic timepiece as claimed in claim 5 wherein the resistance-transistor junction of the second series circuit provides said control signals to said gating means.

10. A battery powered electronic timepiece as claimed in claim 9 wherein said gating means comprises a NAND gate.

* * * * *